(12) United States Patent
Chatrenet et al.

(10) Patent No.: US 9,452,839 B2
(45) Date of Patent: Sep. 27, 2016

(54) ASSEMBLY FOR AIRCRAFT COCKPIT, AIRCRAFT COCKPIT EQUIPPED WITH SUCH ASSEMBLY AND AIRCRAFT

(71) Applicant: AIRBUS OPERATIONS (S.A.S), Toulouse (FR)

(72) Inventors: Nicolas Chatrenet, Colomiers (FR); Eric Petit, Toulouse (FR); Laurent Saint-Marc, Montaigut sur Save (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/041,815

(22) Filed: Sep. 30, 2013

(65) Prior Publication Data

US 2014/0091604 A1    Apr. 3, 2014

(30) Foreign Application Priority Data

Oct. 3, 2012    (FR) ...................................... 12 59395

(51) Int. Cl.
| | |
|---|---|
| *A47C 7/70* | (2006.01) |
| *B64D 11/00* | (2006.01) |
| *B64D 11/06* | (2006.01) |
| *A47C 7/72* | (2006.01) |
| *B64D 43/00* | (2006.01) |
| *B60R 11/00* | (2006.01) |
| *B64D 45/00* | (2006.01) |

(52) U.S. Cl.
CPC ............ *B64D 11/0689* (2013.01); *A47C 7/70* (2013.01); *A47C 7/72* (2013.01); *B64D 11/00153* (2014.12); *B64D 43/00* (2013.01); *B60R 2011/0082* (2013.01); *B60R 2011/0085* (2013.01); *B64D 2045/0075* (2013.01)

(58) Field of Classification Search
CPC ............ A47C 7/70; A47C 7/72; A47C 7/62; A47C 7/68; B64D 2011/0613; B64D 2011/0679; B64D 11/00153; B60R 11/0235; B60R 2011/008; B60R 2011/0084; B60R 2011/0085
USPC .................. 297/116, 145–147, 173, 188.14, 297/188.15, 188.21, 217.3
See application file for complete search history.

(56) References Cited

U.S. PATENT DOCUMENTS

| | | | | |
|---|---|---|---|---|
| 2,514,655 | A * | 7/1950 | Luketa ................... | A47C 1/037 297/145 |
| 5,179,447 | A * | 1/1993 | Lain ........................ | A47C 7/72 248/917 |
| 5,542,360 | A | 8/1996 | Fleming | |
| 5,567,004 | A * | 10/1996 | Pietzsch ................ | B60K 35/00 180/326 |

(Continued)

OTHER PUBLICATIONS

French Search Report for Application No. FR 1259395 dated Jun. 19, 2013.

*Primary Examiner* — Ryan Kwiecinski
(74) *Attorney, Agent, or Firm* — Jenkins, Wilson, Taylor & Hunt, P.A.

(57) ABSTRACT

The assembly for aircraft cockpit comprising a seat in which a crew member is intended to sit and a display and control device. The display and control device is configured to be mounted relative to the seat displaceable between a first position in which the display and control device is arranged to be used in front by the crew member when the latter is sitting in the seat and a second position in which the display and control device is arranged to be used by said crew member to the side and leave free the frontal zone of the crew member when the latter is sitting in the seat. The invention also relates to an aircraft cockpit and an aircraft.

11 Claims, 6 Drawing Sheets

(56) References Cited

U.S. PATENT DOCUMENTS

| | | | | |
|---|---|---|---|---|
| 5,673,628 A * | 10/1997 | Boos | B60N 3/001 | 108/138 |
| 6,588,719 B1 | 7/2003 | Tubach | | |
| 6,597,294 B1 | 7/2003 | Ariens | | |
| 8,020,829 B1 * | 9/2011 | Tamayori | F16M 11/14 | 108/144.11 |
| 8,310,468 B2 * | 11/2012 | Martin | F16M 11/08 | 248/274.1 |
| 2005/0067866 A1 * | 3/2005 | Luong | A47C 1/04 | 297/217.3 |
| 2008/0073946 A1 * | 3/2008 | Maione | A47C 7/70 | 297/161 |
| 2010/0075755 A1 * | 3/2010 | Steelman | G07F 17/32 | 463/37 |
| 2010/0171350 A1 * | 7/2010 | Large | B60N 3/002 | 297/217.3 |
| 2011/0226902 A1 * | 9/2011 | Giannelli | B64D 43/00 | 244/129.1 |
| 2011/0270469 A1 * | 11/2011 | Bopp | B60R 11/02 | 701/3 |
| 2012/0068504 A1 * | 3/2012 | Ting | B60R 11/0235 | 297/135 |
| 2013/0180940 A1 * | 7/2013 | Tsai | A47C 7/70 | 211/119.007 |
| 2013/0248669 A1 * | 9/2013 | Liu | F16M 11/105 | 248/226.11 |
| 2014/0225402 A1 * | 8/2014 | Dehli | A47C 7/70 | 297/173 |
| 2014/0361584 A1 * | 12/2014 | Boenigk | A47C 7/70 | 297/173 |
| 2015/0257539 A1 * | 9/2015 | Drake | A47C 7/70 | 297/135 |

* cited by examiner

ASSEMBLY FOR AIRCRAFT COCKPIT, AIRCRAFT COCKPIT EQUIPPED WITH SUCH ASSEMBLY AND AIRCRAFT

TECHNICAL FIELD

The invention relates to the field of aeronautics and aircraft equipment.

Cockpit ergonomics is a considerable problem for aircraft in general and crucial for those which are long-range aircraft. In fact, in such aircraft, the crew members such as the pilot and the co-pilot must remain at their post for several hours of sustained attention.

Therefore, poorly designed flight deck controls can cause muscular fatigue for the crew member sitting at this post for several hours.

For this reason, and therefore to ensure ergonomics for cockpits and flight decks, it is necessary to equip them with several adapted equipment assemblies.

The invention therefore relates more particularly to an assembly for an aircraft cockpit, to an aircraft cockpit and to an aircraft.

BACKGROUND

With cockpit equipment, the arrangement of the assembly constitutes display and control devices and crew member seats designed to pilot the plane by means of display and control devices is crucial for limiting muscular fatigue for crew members.

In cockpits of current aircraft, it is known to have the control and display devices on the central and side consoles and on the instrument panel. In this configuration, each seat is placed between the central console and the side console corresponding to the instrument panel placed in front of the seat. According to this arrangement, some controls are available on the side and central consoles and therefore easily accessible for the crew members sitting in the seats irrespective of the flight phase of the aircraft. Some more of the controls and display systems are those distributed over the instrument panel with clear visibility for persons sitting in the seats as relates to display systems.

However, if with such a configuration display and control devices are accessible to crew members irrespective of the flight phase of the aircraft, the position of controls on the side and central consoles and on the instrument panel is not ergonomically ideal and during long-range flights or tasks comprising multiple actions can therefore engender substantial muscular fatigue. In fact, studies on cockpit ergonomics have shown that the ideal position for aircraft controls and the display of information is the frontal zone of the crew member when he is sitting in the seat. When the aircraft is in takeoff and landing phase this frontal zone of the crew member must remain free for safety reasons and is therefore not equipped in current aircraft configurations.

SUMMARY

The aim of the present invention is to rectify this drawback.

An aim of the invention therefore is to provide an assembly for cockpit adapted to supply information and a control interface for a crew member, the assembly for cockpit being configured to present better ergonomics relative to an assembly for cockpit of the prior art and respects all the safety constraints of the cockpit when the assembly for cockpit equips the cockpit of an aircraft and the aircraft is in cruise phase.

For this purpose, the invention relates to an assembly for aircraft cockpit comprising a seat for a crew member and a display and control device designed for interactions between the crew member and at least some of the controls of the aircraft, the seat comprising a backrest, the display and control device are configured to be mounted relative to the seat displaceable between a first position in which the display and control device has a part in front of the backrest, and a second position in which the display and control device is to the side of the seat and leaves the zone in front of the backrest free.

Therefore, in the first position said display and control device is positioned so that during its use the crew member has at least one hand interacting with the display and control device in front relative to the torso.

In the second position, said display and control device is positioned such that during its use the crew member has at least one hand interacting with the display and control device in a lateral zone of his torso.

With such configuration of the display and control device, the controls and the display provided by the display and control device are accessible in the first position with maximum ergonomics of the cockpit, the device being positioned in front relative to the crew member sitting in the seat. Therefore in the first position, a crew member sitting in the seat will have access to the controls and to the display provided by the control and display device with minimum muscular fatigue. Also, with displaceable mounting of the display and control device it is possible during landing and takeoff phases of the aircraft to place the display and control device in the second position. In this second position, the display and control device leaves the zone in front of the backrest free and therefore the frontal zone of the crew member also and therefore does not contravene the safety constraints of the cockpit. In this second position, the controls and the information display provided by the display and control device remain fully accessible, with the display and control device being to the side of the seat. When the aircraft is in cruise phase, such an assembly for cockpit therefore provides better ergonomics relative to an assembly for cockpit of the prior art and respects all the safety constraints of the cockpit such as those concerning the landing and takeoff phases.

The display and control device can be configured, when it is in the first position, to be in front of the backrest.

The display and control device can comprise a tactile control system.

The display and control device can comprise a display surface, said control surface being equipped with the tactile control system.

Such a tactile control system improves interaction between the crew member and the aircraft controls. In fact, with such a device, it is easy to adapt the information and the controls available for each of the flight phases of the aircraft.

The display and control device can be mounted directly on the seat and preferably in a configuration in which the seat comprises an armrest, on an armrest of the seat.

Such mounting of the display and control device provides a display and control device which moves with the seat. Therefore, with equipment of the cockpit with an assembly in which the seat is mounted to move, it is not necessary to reposition the display and control device with each displacement of the seat, since the latter moves with the seat.

The display and control device can be configured to be mounted on a structural part of the cockpit.

Such mounting of the display and control device provides assembly in which the display and control device and the seat can be disassembled independently from each other without the need to take down the display and control system during change of seat.

The structural part of the cockpit, on which the display and control device is configured to be mounted, can be part of a wall of the cockpit, such as a lateral side post between a front window and a side window of the cockpit.

The structural part of the cockpit, on which the display and control device is configured to be mounted, can be a lateral structure of the cockpit such as a side console.

A control stick device can be also provided, configured to be mounted on or close to the seat, the display and control device being configured in its first and its second position to give the crew member free access to the control stick device when the crew member is sitting in the seat.

Such a configuration limits the risk of interference between the different control systems present in the cockpit.

The display and control device can be configured so that, in at least one of the first and of the second position, its mounting relative to the seat authorises a change in orientation of the display and control device relative to the seat.

Such a change in orientation of the display and control device can adapt the orientation of the display device to adapt the orientation of the display and control device to external conditions and to the ergonomics of information displayed and controls present on the display and control device.

The change in orientation comprises modification of the inclination of the display and control device relative to the crew member when he is sitting in the seat.

Such a change in inclination adapts the orientation of the device as a function of the lighting of the cockpit.

The display and control device comprises a longitudinal direction defining landscape orientation in which the longitudinal direction is parallel to the floor of the cockpit, and a lateral direction substantially perpendicular to the longitudinal direction and which defines portrait orientation in which the lateral direction is substantially parallel to the floor of the cockpit, and the change in orientation of the display and control device can comprise moving from the landscape orientation to the portrait orientation.

Such a possibility adapts the orientation of the display and control device to the ergonomics of the controls provided by the display and control device.

The display and control device can be configured to be mounted relative to the seat by means of a mounting system comprising at least one pivoting arm, the pivoting arm being adapted to move the display and control device between the first and the second position by its pivoting.

Such an arm provides means for displacement of the display and control device which is robust.

The pivoting arm can be adapted to pivot according to an axis substantially in the sitting plane.

The pivoting arm can be adapted to pivot according to an axis substantially perpendicular to the sitting plane.

The display and control device can be configured to be mounted relative to the seat by means of a mounting system, comprising at least one pivoting arm and a slide system for mounting the arm in translation relative to the seat, the pivoting arm being adapted to move the display and control device between the first and the second position during its translation and its pivoting.

The display and control device can be configured to be mounted relative to the seat by means of a mounting system comprising at least one arm mounted in translation relative to the seat by means of a slide, the arm being adapted to move the display and control device between the first and the second position during its translation.

The mounting system can comprise a ball joint by which the display and control device is connected to the pivoting arm, said ball joint being adapted to authorise a change in orientation of the display device when it is in the first and/or the second position.

Such mounting on the pivoting arm permits modification of the orientation with a ball joint, which is a robust and proven system.

The display and control device can comprise a functional face comprising a display system and a control system, and a support face in front of the functional face, which is adapted to act as support, the display and control device being mounted such that in at least the first position it can be positioned to present its support face turned substantially horizontally upwards to act as support.

Such a support surface in complement with the possibility of changing the orientation provides the crew member with a support for an object such as a meal tray. Therefore when the controls and the display provided by the display and control device are not necessary, the crew member can utilise said device as support for said object.

Another aim of the invention is an aircraft cockpit equipped with an assembly for cockpit according to the invention.

Such a cockpit has optimised ergonomics due to the presence of such an assembly for cockpit adapted to provide information and a control interface for a crew member in optimised ergonomics conditions. In fact, when the aircraft is in cruise phase, such an assembly for a cockpit is configured to present better ergonomics relative to an assembly for cockpit of the prior art and respects all the safety constraints of the cockpit.

Another aim of the invention is an aircraft comprising a cockpit according to the invention.

BRIEF DESCRIPTION OF THE DRAWINGS

The present invention will be more clearly understood from the description of embodiments given purely by way indication and non-limiting, in reference to the attached drawings, in which.

Identical, similar or equivalent parts of the different figures bear the same reference numerals to make it easy to move from one figure to the other.

The different parts illustrated in the figures are not necessarily according to a uniform scale, to make the figures more legible.

DETAILED DESCRIPTION

Figure 1A:
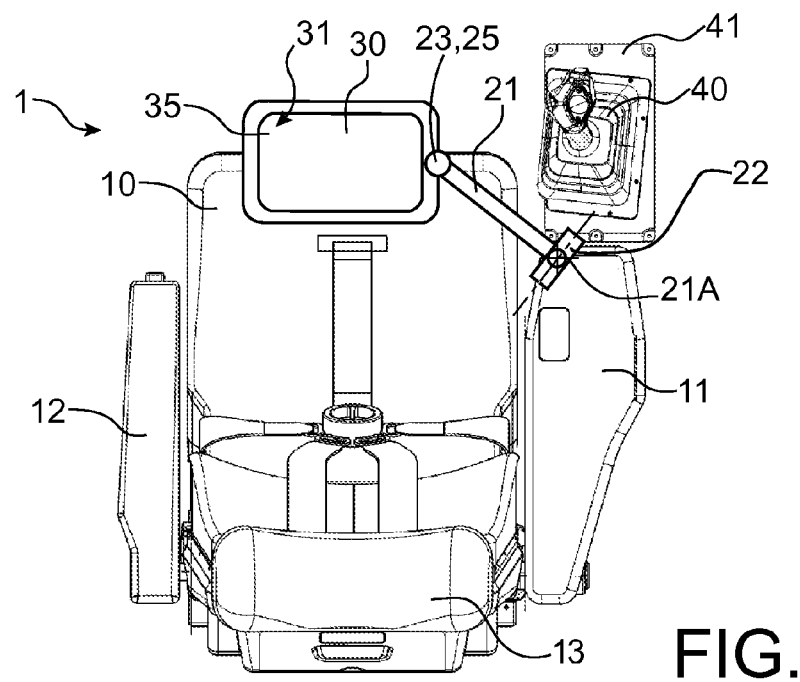
FIGS. 1A and 1B both illustrate a plan view of an assembly for cockpit according to the invention comprising a touch screen tablet in respectively a first position in which it is arranged to be used in front, and in a second position in which it is arranged for be used to the side.
Figure 1B:
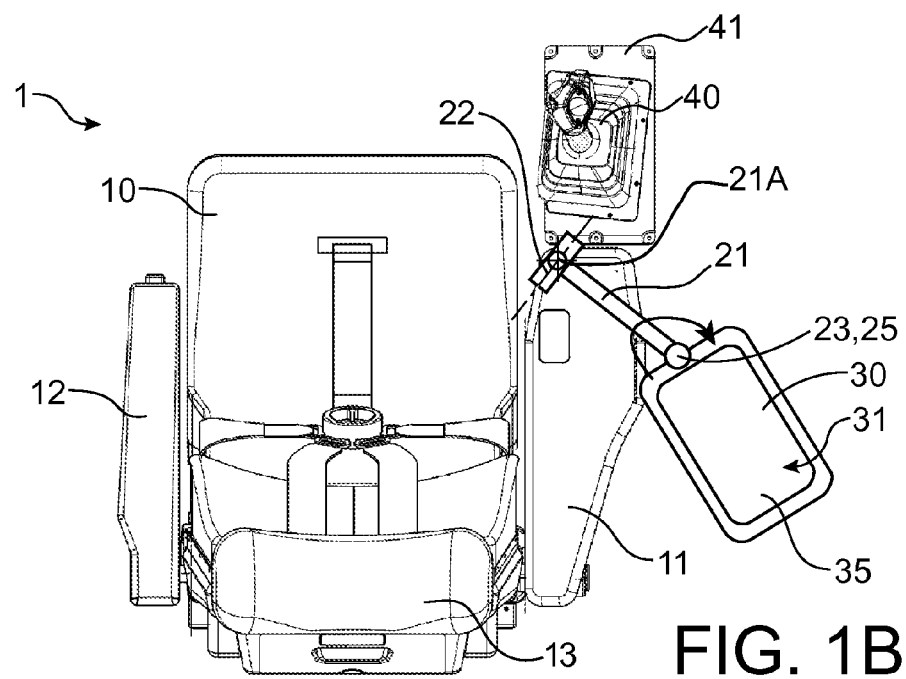

FIGS. 1A and 1B both illustrate an assembly 1 for cockpit which is designed to equip an aircraft cockpit, not illustrated.

Such an assembly 1 for cockpit comprises:
- a seat 10 for a crew member, the seat 10 comprising a first and a second armrest 11, 12 and a backrest 13,
- a pivoting arm 21 mounted pivotably on the first armrest 11, the pivoting arm 21 comprising a first end 22 by which it is mounted pivotably on the first armrest 11 and a second end 23 in front of the first end 22,
- a ball joint 25 equipping the second end 23 of the pivoting arm 21,
- a touch screen tablet 30 mounted on the second end 23 of the pivoting arm 21 by means of the ball joint 25,
- a mini-control stick 40 arranged in the extension of the first armrest 11.

In this case, and in the rest of this document, crew member refers to a person who is required, while an aircraft is in flight, to interact with the controls of the aircraft present in the cockpit, generally, the crew members being the pilot and the co-pilot.

The seat 1 illustrated in FIG. 1A is a classic seat equipping an aircraft cockpit and comprising the safety devices generally present on seats equipping cockpits, such as for example a five-point belt for securing the crew member who is intended to be sitting in it. The backrest 13 delimits a zone in front of the backrest which corresponds to the frontal zone of the crew member when the latter is sitting in the seat 10.

The first and the second armrest are arranged on the lateral sides of the seat. The first armrest 11 is designed to be positioned near a lateral wall of the cockpit, whereas the second armrest is designed to be positioned close to the central zone of the cockpit. Therefore the seat 1 featured in FIGS. 1A and 1B is designed to equip a cockpit on its right lateral part. A seat designed to equip the left lateral part of a cockpit will present the first and the second armrest inverses according to orthogonal symmetry of a vertical plane relative to the floor of the cockpit and substantially parallel to a longitudinal axis of the first or of the second armrest.

The seat 1, when it equips an aircraft cockpit, is arranged between the central console and the corresponding side console of the cockpit, the control systems equipping said central and lateral consoles being accessible to a crew member sitting in the seat 1.

According to a possibility illustrated in FIGS. 1A and 1B, the mini-control stick 40 can be installed on a platform 41 in the extension of the first armrest 11 such that the mini-control stick can be used to the side by a crew member when he is sitting in the seat 1.

According to an alternative to this possibility, not illustrated, the mini-control stick can directly equip the first armrest 11.

At the level of its end in front of the seat and close to the mini-control stick 40, the first armrest 11 exhibits the pivoting arm 21. The pivoting arm 21 is mounted pivotably by its first end on the first armrest 11. Mounting of the pivoting arm is executed by means of a pivot, not referenced. A pivoting axis 21A of the pivot is substantially in the sitting plane and is substantially transversal relative to a longitudinal direction defined by the first armrest. The pivoting axis 21A of the pivot describes an angle substantially of 45° relative to the longitudinal direction defined by the first armrest.

The pivoting arm 21 has an internal longitudinal cavity, not illustrated, designed to house supply and communication cables for supply and communication of the touch screen tablet with the other equipment of the aircraft, such as an onboard computer. According to another alternative, the internal longitudinal cavity of the pivoting arm 21 is designed to house a single supply cable, with communications between the touch screen tablet and the other equipment, such as the onboard computer, being achieved by wireless communication means.

The pivoting arm 21 is adapted to move by its pivoting the touch screen tablet 30 between a first position illustrated in FIG. 1A and a second position illustrated in FIG. 1B.

At its second end 23, the pivoting arm 21 is equipped with the ball joint 25 which connects the pivoting arm 21 to the touch screen tablet 30. The ball joint 25 is configured to authorise a change in orientation of the touch screen tablet 30 when it is in one of two positions illustrated in FIGS. 1A and 1B.

To enable the change in orientation of the touch screen tablet 30 over the entire space the ball joint 25 is adapted to authorise a movement in rotation of the touch screen tablet 30 relative to the pivoting arm on 3 degrees of liberty.

The ball joint 25 is configured to exert friction force against a force tending to change the orientation of the touch screen tablet 30, to define a threshold force for change in orientation necessary for changing the orientation of the touch screen tablet 30. Such threshold force ensures that the touch screen tablet 30 stays in place, the change in orientation of the latter requiring voluntary the application by the crew member of force greater than the threshold force.

The touch screen tablet 30 has a substantially plane rectangular form. The touch screen tablet 30 comprises a length defining a longitudinal direction and a width defining a lateral direction. The touch screen tablet 30 comprises a so-called functional face 31 comprising a display system, and a so-called support face 32 which is in front of the functional face 31.

The functional face comprises a display surface 35 acting as display system. The display surface 35 is the surface of a monitor which can be for example a liquid crystal monitor or even an organic light-emitting monitor. The display surface 35 is adapted to be sensitive to the presence of a human limb, such as a finger, to provide tactile interaction. Such sensitivity to the presence of a human limb can be provided for example by sensitivity to the application of pressure on the display surface 35 or to electric interaction between the display surface 35 and the human limb. With such sensitivity to the presence of a human limb, the display surface 35 is so-called tactile. The display surface 35 of the touch screen tablet 30 forms a control system.

According to a possibility not illustrated here, the functional surface 31 can comprise a member of the wristpad type to improve the comfort of use of the touch screen tablet 30.

Therefore, due to its functional face the touch screen tablet 30 forms a display and control device. Since a touch screen tablet 30 is particularly adapted to man-machine interactions, it is an ideal display and control device for enabling interaction between the crew member and the equipment of the aircraft. In fact, with the touch screen tablet 30, the information displayed can be modified as a function of the flight phase of the aircraft and as a function of the requirements of the crew member relative to the digital controls which can also be varied as a function of the flight phase. It is also evident that with such a display and control device it is easy to reconfigure the information displayed and the commands by simple software update, without the need for hardware update.

To ensure interaction between the touch screen tablet 30 and at least some of the controls of the aircraft, the touch screen tablet 30 is in communication with the onboard computer.

The support face 32, according to one possibility of the invention, is adapted to act as support. Therefore according to this possibility, the crew member can orient the display surface 35 substantially turned horizontally upwards, in front of the sol, such that the support face 32 of the touch screen tablet 30 can act as support for supporting objects such as for example a meal tray.

Figure 2:
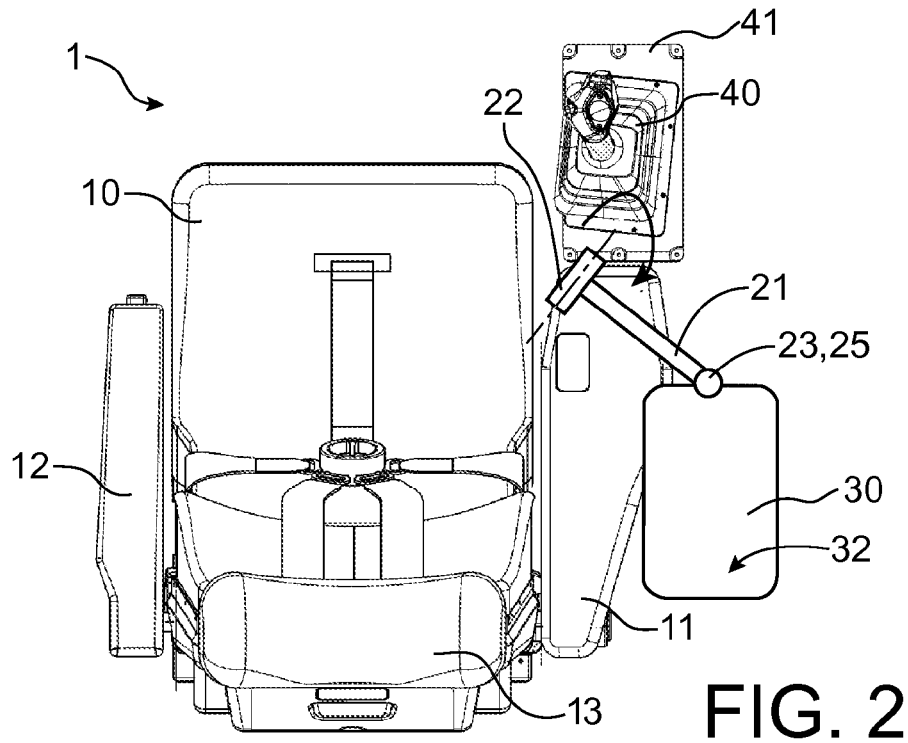
FIG. 2 illustrates a plan view of the assembly for cockpit illustrated in FIG. 1, the touch screen tablet being in an intermediate position by which the touch screen tablet moves between the first and the second position during its displacement.

Such a touch screen tablet 30 can be easily shifted between a first and a second position respectively illustrated in FIG. 1A and FIG. 1B by a displacement process comprising the steps consisting of:

having the pivoting arm 21 pivot to position the touch screen tablet 30 in the intermediate position illustrated in FIG. 2, the touch screen tablet 30 in this position being to the side of the seat 10 with the functional face 31 facing the surface of the floor of the cockpit, effecting a movement of rotation of the touch screen tablet 30 so as to place its functional face 31 in front of the surface of the floor of the cockpit and position it according to the positioning illustrated in FIG. 1B.

In the first position illustrated in FIG. 1A, the touch screen tablet 30 is arranged to be used in front by the crew member when the latter is sitting in the seat. Such a position in front corresponds to a position of the touch screen tablet 30 in front of the backrest 13.

In this position, the touch screen tablet 30 is positioned in front of the crew member when he is sitting in the seat 10 and to use it the crew member must present at least one hand out in front relative to his torso to be able to interact with the touch screen tablet 30. According to ergonomics studies such a position of the touch screen tablet 30 corresponds to the position for handling the touch screen tablet 30 in which the crew member will experience the least muscular fatigue. This position is therefore the ideal position for the touch screen tablet 30 when the aircraft is in cruise phase.

In the second position illustrated in FIG. 1B, the touch screen tablet 30 is arranged to be used by said crew member to the side by leaving the frontal zone of the crew member free when the latter is sitting in the seat 10. With this position, the touch screen tablet 30 is to the side of seat 10 and leaves the zone in front of the backrest 13 free.

In this position, the touch screen tablet 30 is positioned to the side of the crew member when he is sitting in the seat 10 and to use it the crew member must have at least one hand in a lateral zone of his torso to be able to interact with the touch screen tablet 30.

With mounting on the cockpit by way of the pivoting arm, the touch screen tablet 30 is easily displaceable relative to the seat 10 between the first and the second position. Also, since the pivoting arm 21 is mounted on the seat 10 the touch screen tablet 30 for a seat 10 mounted sliding in the cockpit is moved with the seat 10 when the latter is slid.

Also, when it is in one of the two positions illustrated in FIGS. 1A and 1B, the touch screen tablet 30 modifies its inclination relative to the crew member when he is sitting in the seat 10. Therefore the crew member can easily adjust the orientation of the touch screen tablet 30 as a function of the lighting conditions of the cockpit and therefore better manage the problem of reflection phenomena on the display surface 35.

Figure 3:
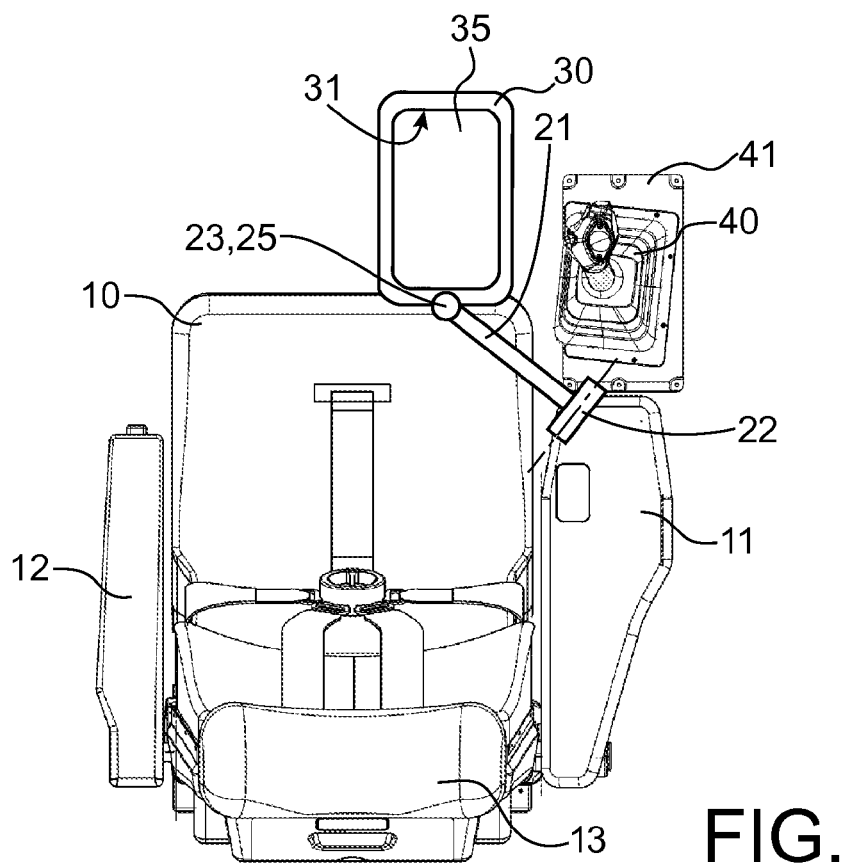
FIG. 3 illustrates a plan view of the assembly for cockpit illustrated in FIG. 1, the touch screen tablet being positioned in the position 1 with portrait orientation.

As is illustrated in FIG. 3, the touch screen member 30 also enables a change in orientation with a possibility of moving from orientation of landscape type to orientation of portrait type. Therefore, for example, FIG. 1A illustrates a configuration of the touch screen member 30 in which it in its first position with orientation of landscape type, whereas FIG. 3 illustrates the touch screen member 30 which is also in the first position, this time with orientation of portrait type.

Both hereinabove and in the rest of this document, landscape orientation and portrait orientation mean a respective orientation in which respectively the longitudinal direction and the lateral direction are substantially parallel to the floor of the cockpit.

Figure 4:
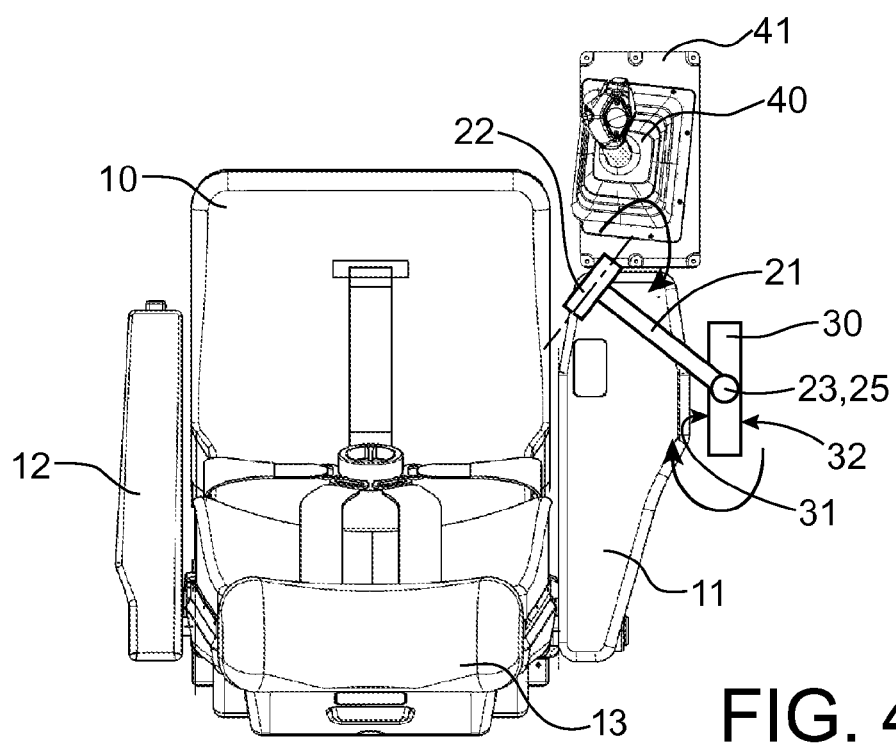
FIG. 4 illustrates a plan view of the assembly for cockpit illustrated in FIG. 1, the touch screen tablet being positioned in a stowed position.
Figure 5:
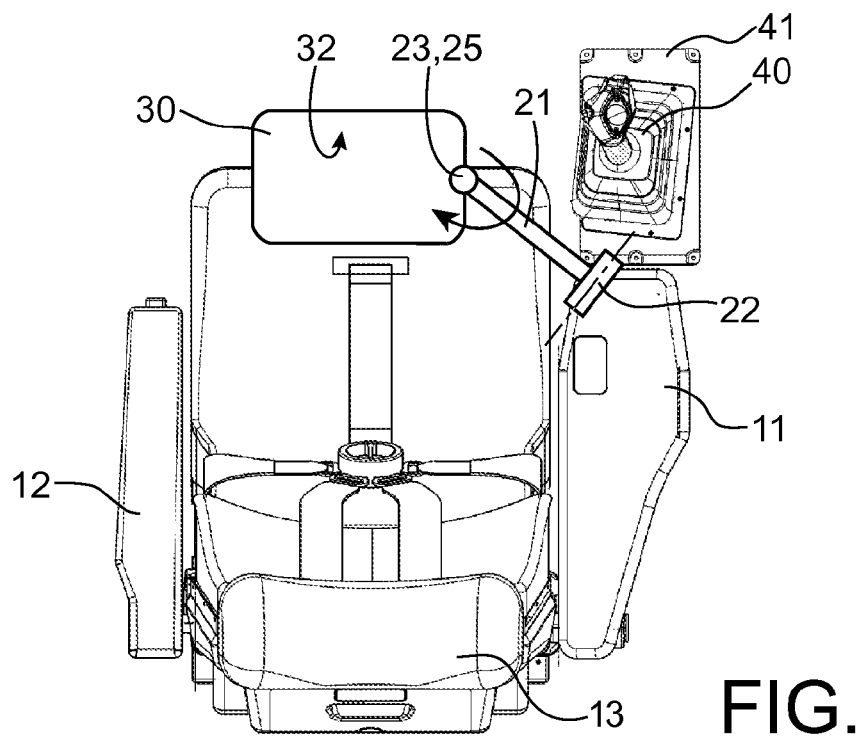
FIG. 5 illustrates a plan view of an assembly for cockpit illustrated in FIG. 1, the touch screen tablet being positioned in a position in which it acts as support.

According to another advantageous possibility of the invention, the touch screen tablet 30 can be positioned in a so-called stowed position which is illustrated in FIG. 4. Such a position consists of placing the touch screen tablet 30, when in the second position, in an orientation substantially perpendicular to the plane of the floor of the cockpit, the functional surface 31 in front of the seat 10. In such a position, the touch screen tablet 30 occupies a projection surface of reduced area and has a low risk of damage to its functional surface 31, the latter being protected by the presence of the seat 10.

In the embodiment described hereinabove and in those described hereinbelow, in the first position the touch screen tablet 30 is entirely in front of the backrest 13. It is also feasible, without departing from the scope of the invention, the touch screen tablet 30 has only one part in front of the backrest, the rest of the touch screen tablet 30 being to the side of the zone in front of the backrest 13.

In the embodiment described hereinabove and in those described hereinbelow, it is evident that the touch screen tablet 30 is mounted directly on the seat 10, and it also feasible that the touch screen tablet 30 is mounted in the cockpit independently of the seat 10. According to such a possibility of the invention which is not illustrated, the touch screen tablet 30 is mounted on a structural part of the cockpit.

According to this possibility the structural part of the cockpit, on which the touch screen tablet 30 is configured to be mounted, can be part of the wall of the cockpit, such as a side post between a front window and a side window of the cockpit or even a lateral structure of the cockpit such as a side console.

Similarly, if in the embodiment described hereinabove and in those described hereinbelow, the display and control device is a touch screen tablet 30, the display device can be another display device, such as a monitor with controls independent of the display surface, without departing from the scope of the invention.

It is also evident that if in the embodiment described hereinabove, the touch screen tablet is mounted in the cockpit by means of a pivoting arm and a ball joint other mounting means can also be employed without departing from the scope of the invention. Therefore, for example, it is possible that the mounting means of the touch screen tablet 30 comprise a stabilising system relative to vibrations or even comprises a system of multiple articulations involving several arms. Both these embodiments described hereinbelow illustrate such alternative mounting means.

Figure 6A:
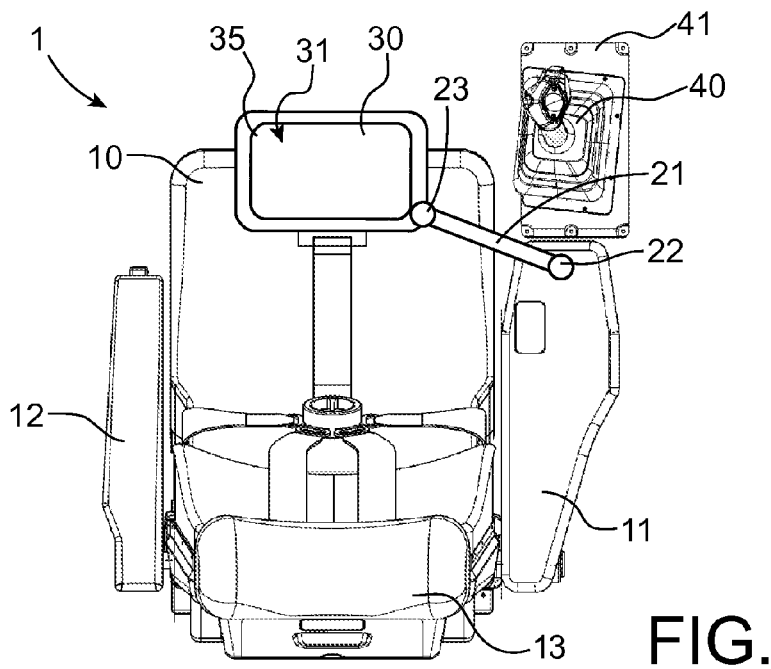
FIGS. 6A to 6C illustrate a plan view of an assembly for cockpit according to a second embodiment in which the pivoting arm pivots according to an axis substantially perpendicular to the sitting plane, FIGS. 6A to 6C representing respectively the touch screen tablet in first position, in second position and in stowed position.
Figure 6B:
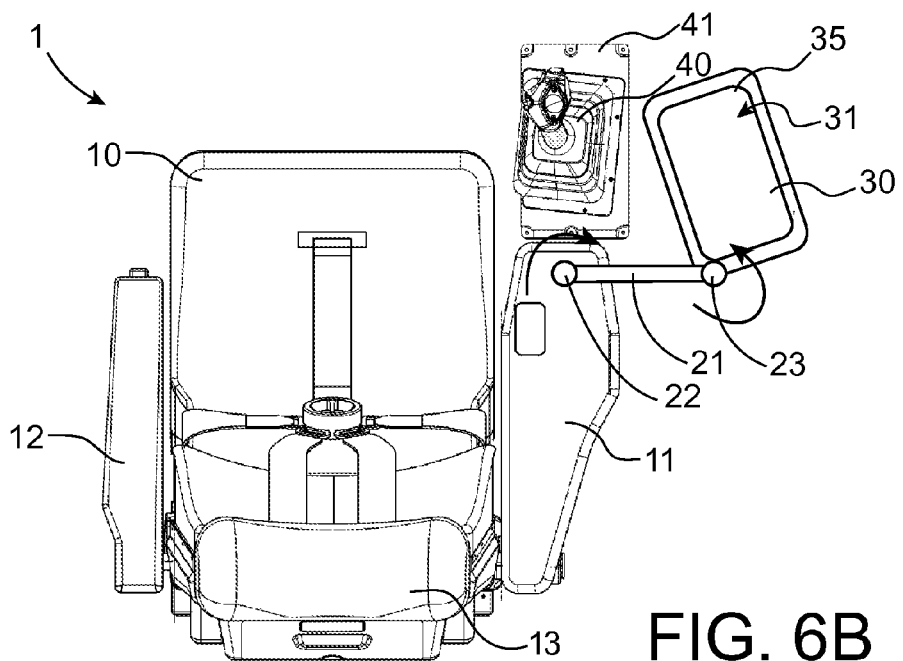
Figure 6C:
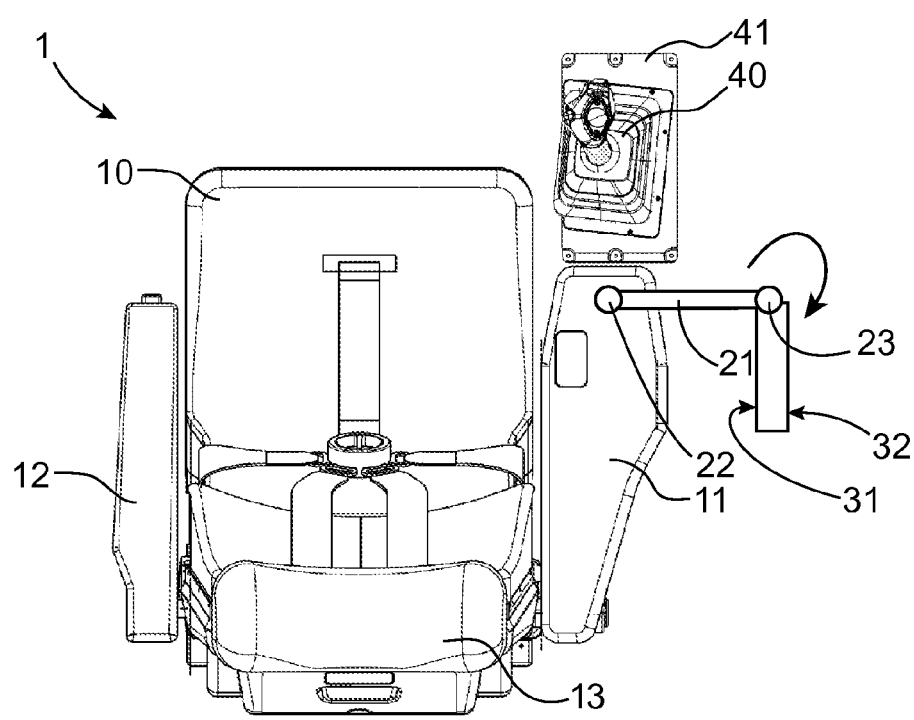

FIGS. 6A to 6C illustrate a second embodiment of an assembly according to the invention in which the pivoting arm 21 is mounted pivotably according to a pivot axis substantially perpendicular to the sitting plane. An assembly according to this second embodiment differs from an assembly according to the first embodiment by this pivoting mounting according to an axis substantially perpendicular to the sitting plane and by its displacement kinematics between the first and the second position, since it is not necessary to turn the touch screen tablet over during this displacement.

In fact, in this embodiment displacement of the touch screen tablet between the first and the second position, respectively illustrated in FIGS. 6A and 6B, is done in two steps, a pivoting step of the touch screen tablet by means of the pivoting mounting and a step of change in orientation by means of the ball joint 23. With an assembly according to this second embodiment, and with pivoting achieved by pivoting in the sitting plane, the touch screen tablet 30 is not turned over during pivoting and the functional surface 31 stays perfectly visible throughout displacement of the touch screen tablet 30 from the first to the second position.

According to a principle similar to that of the possibility of the stowed position described in the first embodiment, in this second embodiment the ball joint 23 enables placement of the touch screen tablet 30 in a stowed position, such as illustrated in FIG. 6C.

Figure 7A:
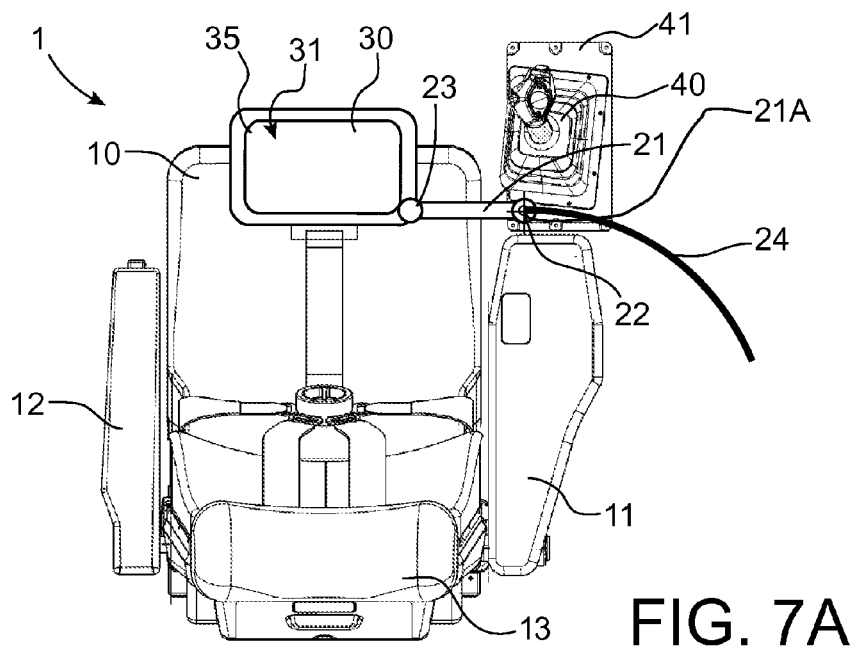
FIGS. 7A and 7B illustrate a plan view of an assembly for cockpit according to a third embodiment in which the pivoting arm pivots according to an axis substantially perpendicular to the sitting plane, FIGS. 7A to 7B representing respectively the touch screen tablet in first position and in second position.
Figure 7B:
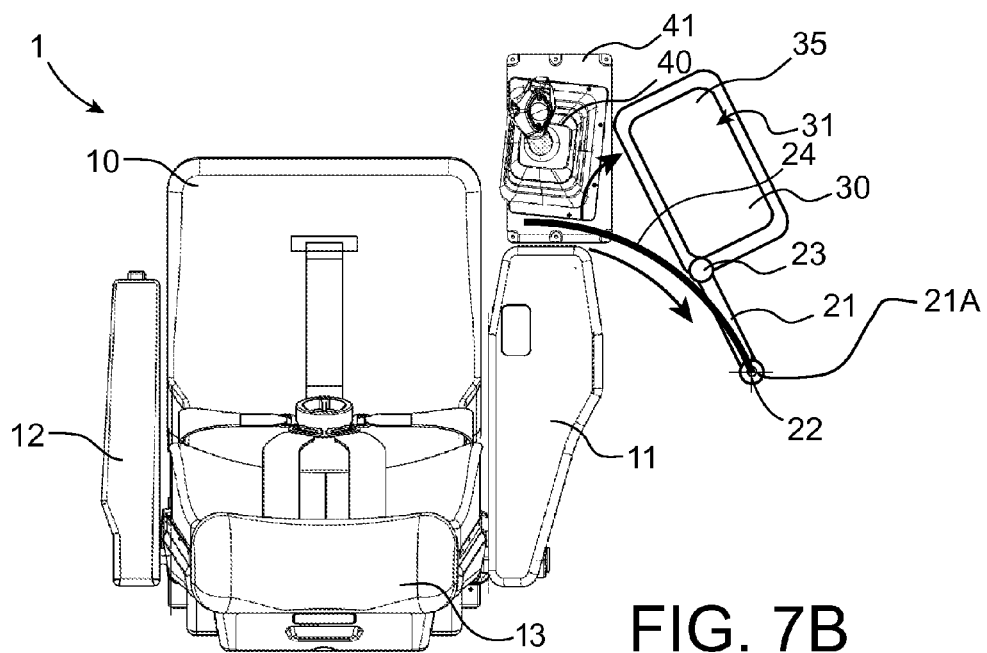

FIGS. 7A and 7B illustrate a third embodiment of an assembly according to the invention in which a mounting system is provided, comprising at least one pivoting arm 21 and a slide system. An assembly according to this third embodiment differs from an assembly according to the second embodiment in that the pivot of the pivoting arm 21 is mounted in translation on the slide system relative to the seat.

The mounting in translation on the slide system comprises a rail 24, mounted fixed relative to the seat, along which a sliding support such as slide, not illustrated, is mounted in translation. The rail 24, according to the configuration illustrated in FIGS. 7A and 7B, is curvilinear and extends in a plane parallel to the sitting plane.

The pivoting arm 21 is mounted pivotably on the support sliding by means of a pivot of pivoting axis 21A substantially perpendicular to the sitting plane.

Therefore, in this third embodiment, displacement of the touch screen tablet 30 between the first and the second position, illustrated respectively in FIGS. 7A and 7B, can be achieved in two stages. In a first stage, the crew member has the assembly touch screen tablet 30, pivoting arm 21 and support sliding translated along the rail by covering the entire length of the rail 24. In a second stage, the pivoting arm 21 is pivoted about a pivoting axis 21A to place the touch screen tablet 30 in the second position.

An assembly according to this third embodiment is particularly advantageous for offering greater freedom to the crew member as to positioning of the touch screen tablet in the second position without as such causing substantial complexity of the assembly.

Of course, the configuration of the rail 24 described hereinabove is given only by way of example and is therefore not limiting. It is feasible, without departing from the scope of the invention, that the rail 24 is linear and non-curvilinear or even that the configuration of the rail 24 is adapted to the touch screen tablet 30 being directly moved from the first to the second position without it being necessary to employ a pivoting arm. According to the latter possibility, the rail 24 can extend according to a curve adapted to modify the orientation of the touch screen tablet 30 so that in the second position the touch screen tablet has an orientation making interaction between the crew member and the touch screen tablet 30 easier.

The invention claimed is:

1. An assembly for an aircraft cockpit, the assembly comprising:
   a seat for a crew member, the seat comprising a backrest with lateral borders, the backrest defining a front zone of the backrest which is laterally delimited by the lateral borders of the backrest; and
   a display and control device designed for interactions between the crew member and at least some controls of the aircraft, the display and control device comprising a functional face comprising a display and control system, and a support face which is disposed on an opposite side with respect to the functional face, the support face being configured to act as support;
   wherein the display and control device is mounted on the seat displaceable between a first position in which the display and control device is in the front zone of the backrest and a second position in which the display and control device is to a side of the seat and leaves free the front zone of the backrest;
   wherein in both the first position and the second position the functional face facing the crew member when the crew member is seated in the seat such that the crew member controls and interacts with the at least some controls of the aircraft by using the display and control device without moving the display and control device; and
   wherein the display and control device is mounted on the seat by a mounting system comprising:
      at least one pivoting arm to move the display and control device between the first and the second position, and
      a ball joint by which the display and control device is connected to the pivoting arm, the ball joint being adapted to authorise a change in orientation of the display and control device when the display and control device is in the first and the second position such that in at least the first position the display and control device could be positioned to present the support face turned substantially horizontally upwards to act as support.

2. The assembly as claimed in claim 1, further comprising a control stick device configured to be mounted on or close to the seat, the display and control device and the control stick device being configured, when in the first and the second position of the display and control device, to allow the crew member free access to the control stick device when the crew member is sitting in the seat.

3. The assembly as claimed in claim 1, wherein the display and control device is configured so that, in at least one of the first and the second position, mounting of the display and control device relative to the seat authorises a change in orientation of the display and control device relative to the seat.

4. The assembly as claimed in claim 1, wherein the pivoting arm is adapted to move the display and control device between the first and the second position by pivoting.

5. The assembly as claimed in claim 4, wherein the mounting system comprises a ball joint by which the display and control device is connected to the pivoting arm, the ball joint being adapted to authorise a change in orientation of the display and control device when the display and control device is in the first or the second position.

6. The assembly as claimed in claim 1, wherein the mounting system further comprises a slide system to mount the arm in translation relative to the seat, the pivoting arm being adapted to move the display and control device between the first and the second position during translation and pivoting.

7. The assembly as claimed in claim 1, wherein the at least one pivoting arm is adapted to move the display and control device between the first and second positions by pivoting of the pivoting arm, a pivoting axis of the pivoting arm being substantially in a sitting plane and substantially transversal to a longitudinal direction of the seat.

8. An aircraft cockpit equipped with an assembly for an aircraft cockpit as claimed in claim 1.

9. An aircraft cockpit comprising:
  a seat for a crew member, the seat comprising a backrest with lateral borders, the backrest defining a front zone of the backrest which is laterally delimited by the lateral borders of the backrest; and
  a display and control device designed for interactions between the crew member and at least some controls of the aircraft, the display and control device comprising a functional face comprising a display and control system, and a support face which is disposed on an opposite side with respect to the functional face, the support face being configured to act as support;
  wherein the display and control device is mounted in the aircraft cockpit relative to the seat and displaceable between a first position in which the display and control device is in the front zone of the backrest and a second position in which the display and control device is to the side of the seat and leaves free the front zone of the backrest;
  wherein in both the first position and the second position the functional face facing the crew member when the crew member is seated in the seat such that the crew member controls and interacts with the at least some of the controls of the aircraft by using the display and control device without moving the display and control device; and
  wherein the display and control device is mounted in the aircraft cockpit by a mounting system comprising:
    at least one pivoting arm to move the display and control device between the first and the second position, and
    a ball joint by which the display and control device is connected to the pivoting arm, the ball joint being adapted to authorise a change in orientation of the display and control device when the display and control device is in the first and the second position such that in at least the first position the display and control device could be positioned to present the support face turned substantially horizontally upwards to act as support.

10. The aircraft of claim 9, wherein the at least one pivoting arm is adapted to move the display and control device between the first and second positions by pivoting of the pivoting arm, a pivoting axis of the pivoting arm being substantially in a sitting plane and substantially transversal to a longitudinal direction of the seat.

11. An aircraft comprising a cockpit as claimed in claim 9.

* * * * *